(12) United States Patent
Olsson

(10) Patent No.: US 6,194,866 B1
(45) Date of Patent: Feb. 27, 2001

(54) ARRANGEMENT AND A METHOD RELATING TO EXCHANGE OF DIGITAL INFORMATION BETWEEN DEVICES COMPRISING ELECTRIC CIRCUITRY

(75) Inventor: Torbjörn Olsson, Södra Sandby (SE)

(73) Assignee: Telefonatiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 09/468,982

(22) Filed: Dec. 21, 1999

(30) Foreign Application Priority Data

Dec. 22, 1998 (SE) .................................................. 9804515

(51) Int. Cl.⁷ ...................................................... H02J 7/00
(52) U.S. Cl. ........................................ 320/106; 340/310.01
(58) Field of Search ...................................... 320/106, 109; 340/310.01, 825.69; 307/125; 455/38.3

(56) References Cited

U.S. PATENT DOCUMENTS

| | | | |
|---|---|---|---|
| 4,731,813 | | 3/1988 | Schroeder ............................ 379/413 |
| 5,021,779 | * | 6/1991 | Bisak ................................ 340/825.69 |
| 5,206,097 | | 4/1993 | Burns et al. ......................... 320/114 |
| 5,530,431 | * | 6/1996 | Wingard ........................... 340/310.01 |
| 5,534,765 | | 7/1996 | Kreisinger et al. ................... 320/106 |
| 5,656,917 | * | 8/1997 | Theobald .............................. 320/106 |
| 5,717,306 | * | 2/1998 | Shipp .................................... 307/125 |
| 5,859,522 | * | 1/1999 | Theobald .............................. 320/106 |
| 5,870,615 | * | 2/1999 | Bar-on et al. ........................ 320/106 |
| 5,907,795 | * | 5/1999 | Hwang .................................. 455/38.3 |
| 6,005,489 | * | 12/1999 | Siegle et al. ..................... 340/825.69 |
| 6,087,805 | * | 7/2000 | Langston et al. ..................... 320/109 |

FOREIGN PATENT DOCUMENTS

| | | |
|---|---|---|
| 0 572 152 | 12/1993 | (EP) . |
| 0 762 592 | 3/1997 | (EP) . |
| 0 844 486 | 5/1998 | (EP) . |
| WO 96/16451 | 5/1996 | (WO) . |

OTHER PUBLICATIONS

Edlund B., International–Type Search Report, Search Request No. SE98/01512, Oct. 4, 1999, pp. 1–8.

* cited by examiner

Primary Examiner—Peter S. Wong
Assistant Examiner—Pia Tibbits
(74) Attorney, Agent, or Firm—Jenkens & Gilchrist

(57) ABSTRACT

An electric arrangement, a battery pack and methods for transmitting digitally encoded information from a first electric device to a digital processor in a second electric device, and a battery information signal transmitted between the devices. An encoder is located in the first electric device and contains the digitally encoded information. A communication line capable of conveying electric information signals representing the information connects the electric devices. A decoder is located in the second electric device and is capable of decoding the information signals into information and supplying the information to the processor in the second device.

21 Claims, 3 Drawing Sheets

ARRANGEMENT AND A METHOD RELATING TO EXCHANGE OF DIGITAL INFORMATION BETWEEN DEVICES COMPRISING ELECTRIC CIRCUITRY

TECHNICAL FIELD OF THE INVENTION

The present invention relates to arrangements, a battery pack and methods for enabling exchange of information between a first electric device and a second electric device as well as a signal conveyed between these devices.

More specifically, the invention relates to arrangements, a battery pack, methods and a signal for enabling exchange of digital information between a first device such as a battery pack, which is connected to a second portable device such as a portable communication device via a single electric communication line.

DESCRIPTION OF RELATED ART

Small, portable and lightweight battery powered electrical devices with detachable accessories, such as e.g. mobile telephones, personal organizers and hand held computers, have in many fields become indispensable every-day items. Due to the rapid development of processing and memory capacity these devices now perform tasks that were almost unimaginable only a few years back in time. Nevertheless, an ever increasing demand for more powerful devices, mainly in terms of processing capability and ease of use, has led to an ever increasing demand on the most essential accessory for any electric device: the battery.

In the field of technical development of rechargeable battery packs, one of the central issues is how to enable quick and safe recharging. It is, for example, of interest to enable charging circuits and software within a processing unit of a mobile communication station, to optimize its charging procedure. That is, in essence, how to regulate charging current and voltage during the period of charging. In order to do this, it is desirable to have access to more or less detailed information about individual battery packs. Static information regarding, e.g., battery type and dynamic information such as current state of charge etc. may be of interest.

Information can be stored in, and retrieved from a battery pack using different techniques. A straight forward technique is of course to include a digital memory, such as e.g. an EEPROM according to known technique exemplified by U.S. Pat. No. 5,534,765 by Kreisinger et al. Communication between the memory and a battery charger is in U.S. Pat. No. 5,534,765 realized using the I2C two-wire protocol specification which is known in the art.

It is to be noted that the solution disclosed in U.S. Pat. No. 5,534,765 in fact relies entirely on the use of the I2C protocol, and is thus, relatively speaking, a complex solution in terms of need for, e.g., a synchronization clock signal.

A much more simple approach to storage of information in a battery pack, and also the means of retrieving the information from the battery pack to a device to which the battery pack is attached, is disclosed in U.S. Pat. No. 5,489,834 by Pitkanen. Information about battery type is encoded in terms of a resistance value of a resistor. A measurement of a voltage drop across the information-carrying resistor is used to estimate its resistance, which is then interpreted in terms of battery type.

This approach requires that, in order to enable encoding of many different types of batteries, different batteries need to be equipped with different resistors. Furthermore, because this is a solution utilizing analog circuits, potentially interfering effects such as temperature changes, as manifested in a change of resistivity, must be considered when encoding information in the resistors.

SUMMARY OF THE INVENTION

In view of prior art as discussed above, a number of problems remain to be solved regarding information storage and retrieval between an electric device and an accessory such as a battery pack attached to the device.

A problem solved by the present invention is hence how to enable a simple solution for information transfer between a first electric device, such as a battery pack, and a second electric device, such as a portable electric device like a portable communication device, where the first device contains information needed for proper utilization of the devices.

Within the framework of the general problem, there is a problem of how to enable simple information transfer via a single communication line, with no need for synchronization of the information transfer means.

The object of the present invention is to overcome the problems as stated above. This is in short achieved by providing means in the form of electric arrangements located in a first device communicating via a single communication line with circuitry in a second electric device.

In some more detail, it is shown an arrangement for transmitting digitally encoded information from a first electric device or from a battery pack to a digital processor in a second electric device or in a portable electric device. The arrangement comprises an encoder located in the first electric device or battery pack, said encoder containing the digitally encoded information, and a single communication line capable of conveying electric information signals representing the information between the electric devices, and a decoder located in the second electric device or portable electric device, where said decoder is capable of decoding the information signals into information and supplying the information to the processor in the second device.

The encoder supplies the information digitally encoded on at least one output terminal. A variable voltage generator is located in the second device or portable electric device and connected to the communication line, and is capable of supplying a sequence of voltage levels to the communication line. A voltage dependent current generator is located in the first device or battery pack and connected to the at least one output terminal of the encoder and the communication line, where said current generator is capable of outputting the information signals in the form of a sequence of current levels through the communication line. The sequence of current levels is dependent both on the voltage level as detected on the communication line and the digitally encoded information on the at least one output terminal of the connected encoder. A current detector is located in the second device or portable electric device and is connected between the communication line and the decoder.

The problem is also solved by a battery pack including the features of the first arrangement responding to a sequence of voltage levels output by a portable electric device.

The problem is also solved by a method for exchanging information between a portable electric device and a battery pack and a method of sending information from a battery pack to a portable electric device, where the battery pack receives a sequence of voltage levels from the portable electric device, selects digitally encoded information in dependence of the sequence of voltage levels and transmits the encoded information as a sequence of current levels to the portable electric device.

The problem is furthermore solved by providing a battery information signal comprising a sequence of voltage levels generated in the portable electric device and a sequence of current levels generated by the battery pack in dependence of said voltage levels and of digitally encoded information in the battery pack.

An advantage of the present invention is that only one communication line is needed for the transfer of information between the devices.

Another advantage of an arrangement according to the invention is that no electric power is consumed when the arrangement is not utilized to transfer information.

Yet another advantage is that an arrangement according to the invention is possible to implement using only a few and simple components.

DETAILED DESCRIPTION OF PREFERRED EMBODIMENTS

Figure 1A:
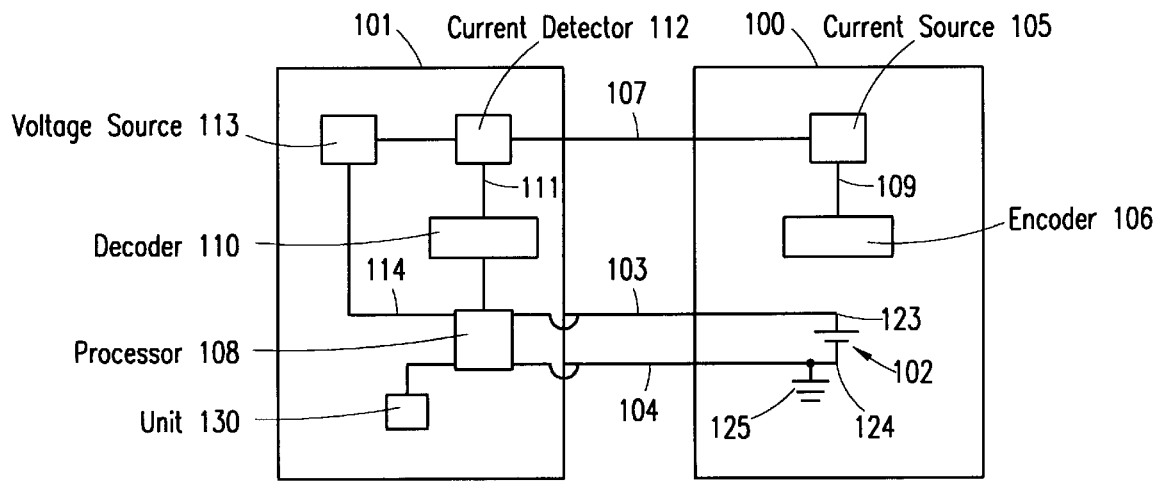
FIG. 1a shows a schematic view of an arrangement according to the present invention, comprising a battery pack and an electric device.

A first preferred embodiment of an arrangement according to the present invention is shown schematically in FIG. 1. A battery pack 100 is electrically and mechanically connected to an electric device 101. The electric device is preferably a portable electric device. The battery pack 100 and the device 101 are schematically shown as boxes in order to stress the fact that the present invention relates to a diverse collection of battery powered electrical implements. For the same reason, the actual means for mechanical and electrical connection have been omitted from the illustration. It is also to be understood that the battery pack 100 and the device 101 are mechanically and electrically attachable and detachable from each other.

A typical example of this kind of arrangement is a portable mobile telephone terminal equipped with a detachable battery pack. However, it is to be understood that a person skilled in the art is capable of implementing the present invention in other types of battery powered devices without applying any inventive efforts. Other types of battery powered devices include hand held computers, lap top computers, hand held electronic games, pagers, etc. However, these are just examples. Many more examples exist. The invention is thus not limited to mobile phones or even to portable communication devices. It applies to any type of battery powered portable equipment.

The battery pack 100 comprises a battery cell 102, or a collection of cells, with a positive terminal 123 and a negative terminal 124. The negative terminal is designated as being signal ground as indicated by the signal ground symbol 125. The terminals 103, 104 are connected to the device 101, as the skilled person would comprehend, and is hence only schematically indicated in the figure.

Figure 1B:
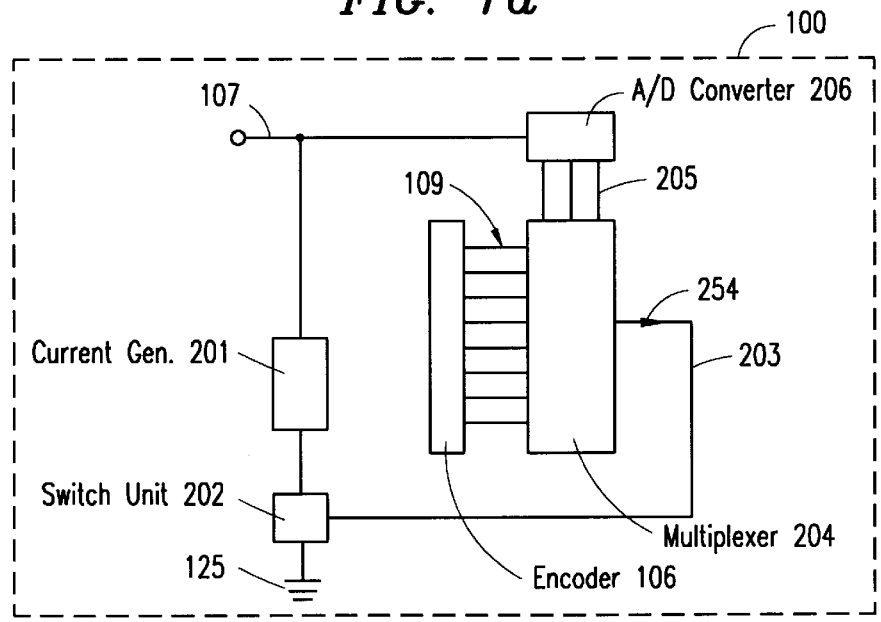
FIG. 1b shows a schematic view of circuitry comprised in a battery pack according to the present invention.

An encoder 106, containing information as will be described in some detail below in connection with FIG. 1b, is connected via an encoder connection line 109 to a voltage dependent current source 105. The function of the voltage dependent current source 105 will be described below in connection with FIG. 1b.

A device communication line 107 is connected between the voltage dependent current source 105 in the battery pack 100 and a current detector 112 in the portable device 101. As indicated above, it is outside the scope of the present invention to specify any particular connection means, since electric connection means of various types suitable for this kind of communication is known in the art. Further details regarding the function of the current detector will be described below in connection with FIG. 1c.

A decoder 110 is connected to the current detector 112 via a decoder connection line 111, and the decoder 110 is in turn connected to a processor 108. The processor 108 controls, as is known in the art, all functions in the device 101, as for example signaling and maintaining of radio connections in the case the device 101 is a mobile telephone terminal. Means for signaling and establishing and maintaining radio connection are shown in FIG. 1a in the form of one single device specific unit 130. The processor 108 is further connected to a variable voltage source 113 via a first processor connection line 114. The variable voltage source 113 is connected via the current detector 112 to the device communication line 107.

The device processor 108 is also connected to the battery cell 102 in the battery pack 100 via a supply lead 103 and a signal ground lead 104. And it is to be noted that, although it is not shown in the figure, all other units in addition to the processor 108 that are comprised in the device 101 are also supplied with power via these leads 103,104.

Needless to say, the circuitry in the battery pack 100 may be physically located either in separate units, such as illustrated in FIG. 1, or integrated into one single unit such as a so called application specific integrated circuit (ASIC).

FIG. 1b shows in some more detail the units comprised in the battery pack 100, and their interrelation. The encoder 106 is connected to a digital multiplexer 204 via the encoder connection line 109, which is shown to be in the form of an 8-bit parallel data connection line. Needless to say, encoders and multiplexers having parallel interconnection are well known in the art and need not be described further, except to stress that the encoder may be of any complexity, ranging from a simple network of discrete components to any form of digital memory.

A 3-bit digital connection line 205 connects the multiplexer 204 and an analog-to-digital converter (A/D converter) 206 which in turn is connected to the device connection line 107. The multiplexer 204 is further connected to a switching unit 202 via a switch control line 203. The switching unit 202 is connected between signal ground 125 and the device connection line 107 via a current generator 201.

As to the function of the units schematically described in FIG. 1b, the A/D converter 206 accepts an analog signal via the device connection line 107 in the form of a voltage level as will be further discussed below in connection with FIGS. 2a–c. According to the art the A/D converter 206 digitizes the voltage level and adjusts its digital output such that the digital connection line 205 supplies a 3-bit address to the multiplexer 204. The multiplexer 204 selects according to known art one encoded bit as sensed via the 8-bit encoder connection line 109, and conveys this digital one-bit information 254 to the switch control line 203. The switching unit 202 is capable according to known art of sensing the digital information conveyed via the switch connection line and adjusting its state to one of two states, one being connected and the other state being disconnected. In the connected state, the switching unit 202 enables the current generator to supply a predetermined current to the device connection line 107. In the disconnected state, the switching unit 202 isolates the device connection line 107 from signal ground 125 and no current is allowed to flow through the device connection line 107.

Figure 1C:
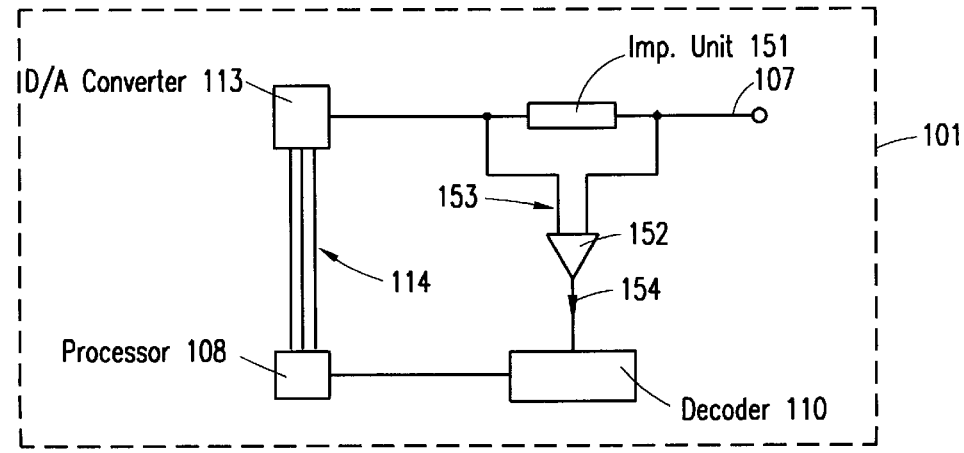
FIG. 1c shows a schematic view of circuitry comprised in an electric device according to the present invention.

Continuing now with a more detailed disclosure of the units comprised in the device 101, FIG. 1c shows the decoder 110 connected to the processor 108. The decoder 110 is further connected to a comparator 152 having a two line differential input connection 153 which is connected across an impedance unit 151, thus acting as a current detector as already indicated above in connection with FIG. 1a. The impedance unit 151 is connected in series between the variable voltage source 113, which is in the form of a digital-to-analog converter (D/A converter) 113. The D/A converter 113 is in turn connected to, and controlled by, the processor 108 via the first processor connection line 114 which in this embodiment is in the form of a 3-bit digital connection.

As to the function of these units, the processor 108 is capable of supplying a 3-bit digital number, representing a voltage level, to the D/A converter 113. The D/A converter 113 converts the digital number into a voltage, which is conveyed via the device connection line 107 to the circuitry in the battery pack 100.

Electric current emanating from the current generator 201 in the battery pack 100 flows via the device connection line 107 through the impedance unit 151. This current creates a voltage drop across the impedance unit 151, which is sensed by the comparator 152. This sensing by the comparator 152 results in a digital signal 154 being conveyed to the decoder 110. This signal corresponds to the digital one-bit information 254 as output from the encoder 106 via the multiplexer 204 in the battery pack 100.

Figure 2A:
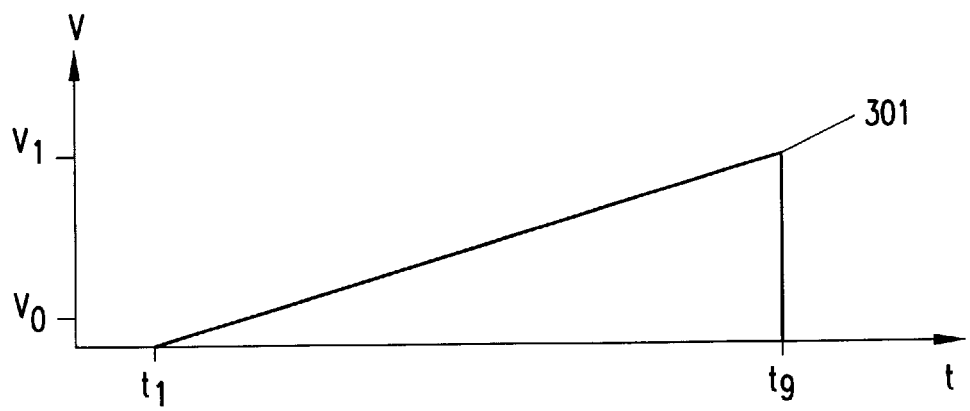
FIGS. 2a–c show schematic diagrams of variations and sequences of voltage levels and current levels representative of information transferred between a battery pack and an electric device according to the present invention.
Figure 2B:
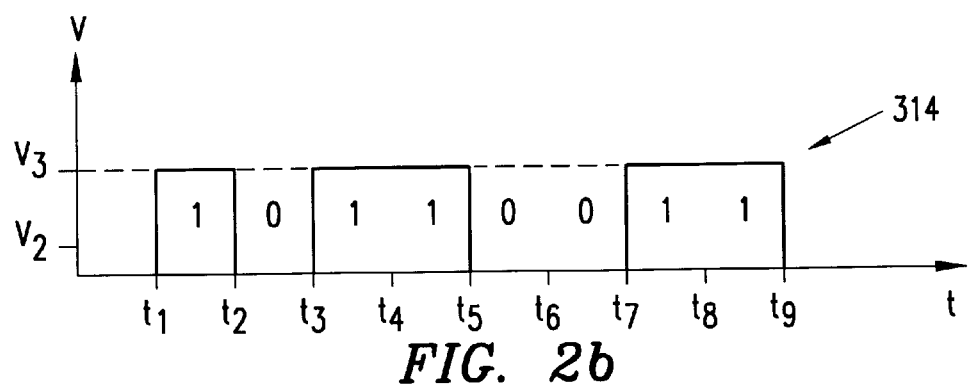
Figure 2C:
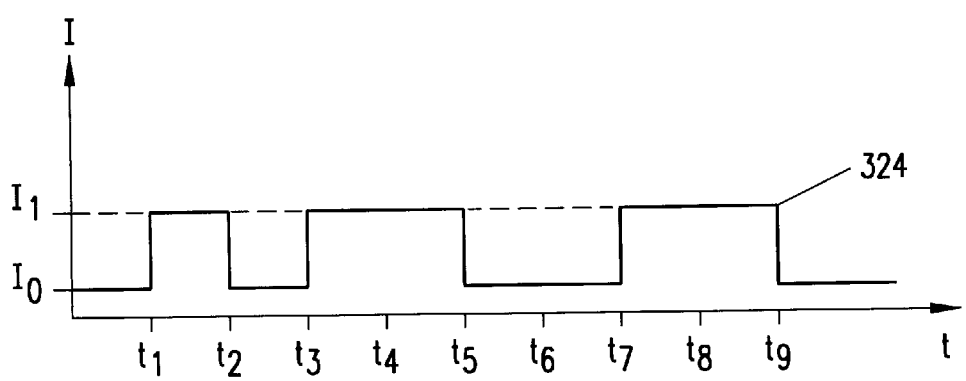

FIGS. 2a–c illustrate by means of diagrams different voltage and current levels representative of information being transferred between the battery pack 100 and the device 101.

FIG. 2a shows a diagram of voltage V as a function of time t. It is shown a representation of a typical voltage level variation 301 as output by the D/A converter 112 in the device 101. The D/A converter 112, which is controlled by, e.g., software running in the device processor 108, accepts a sequence of increasing digital numbers, beginning at a first point in time t1 at a first voltage level V0 and increasing to a second voltage level V1 at a later point in time t9. As discussed above, this voltage level variation 301 is sensed by the A/D converter 206 in the battery pack 100 and converted into a digital address as discussed above in connection with FIG. 1b and below in connection with FIG. 2b.

FIG. 2b shows a diagram of voltage V as a function of time t. It is shown an example of a binary sequence 314 of voltage levels as output by the multiplexer 204 as it is stepped through different addresses by means of the 3-bit address input from the A/D converter 206, where the 3-bit address originates from the analog voltage level variation 301 discussed above in connection with FIG. 2a.

The sequence 314 is conveyed via the switch connection line 203 to the switching unit 202 in the battery pack 100. As briefly indicated above in connection with FIG. 1b, the sequence 314 represents binary information emanating from the encoder, the information bit "1" being output between a first point in time t1 and a second point in time t2 and a second bit "0" of information being output between the second point in time t2 and a third point in time t3, continuing with bits of information until a ninth point in time t9.

FIG. 2c shows a diagram of electric current I as a function of time t. It is shown a sequence 324 of current levels as output by the current generator 201 to the device communication line 107. The current sequence 324 causes a corresponding sequence of binary voltage levels (not shown in the figure) as sensed across the impedance unit 151 by the comparator 152 and conveyed to the decoder 110.

In order to exemplify, the information stored in the encoder 106, and represented by the voltage levels and current levels shown in FIGS. 2a–c, may comprise information such as battery type, manufacturer codes, date of manufacture, capacity etc. Indeed, any type of information pertaining to the battery pack 100 and its performance in connection with a device 101 is understood to be within the scope of the present invention.

The voltage in FIG. 2a together with the current in FIG. 2c together form a battery information signal appearing on the communication line between the electric device and the battery pack.

Figure 3:
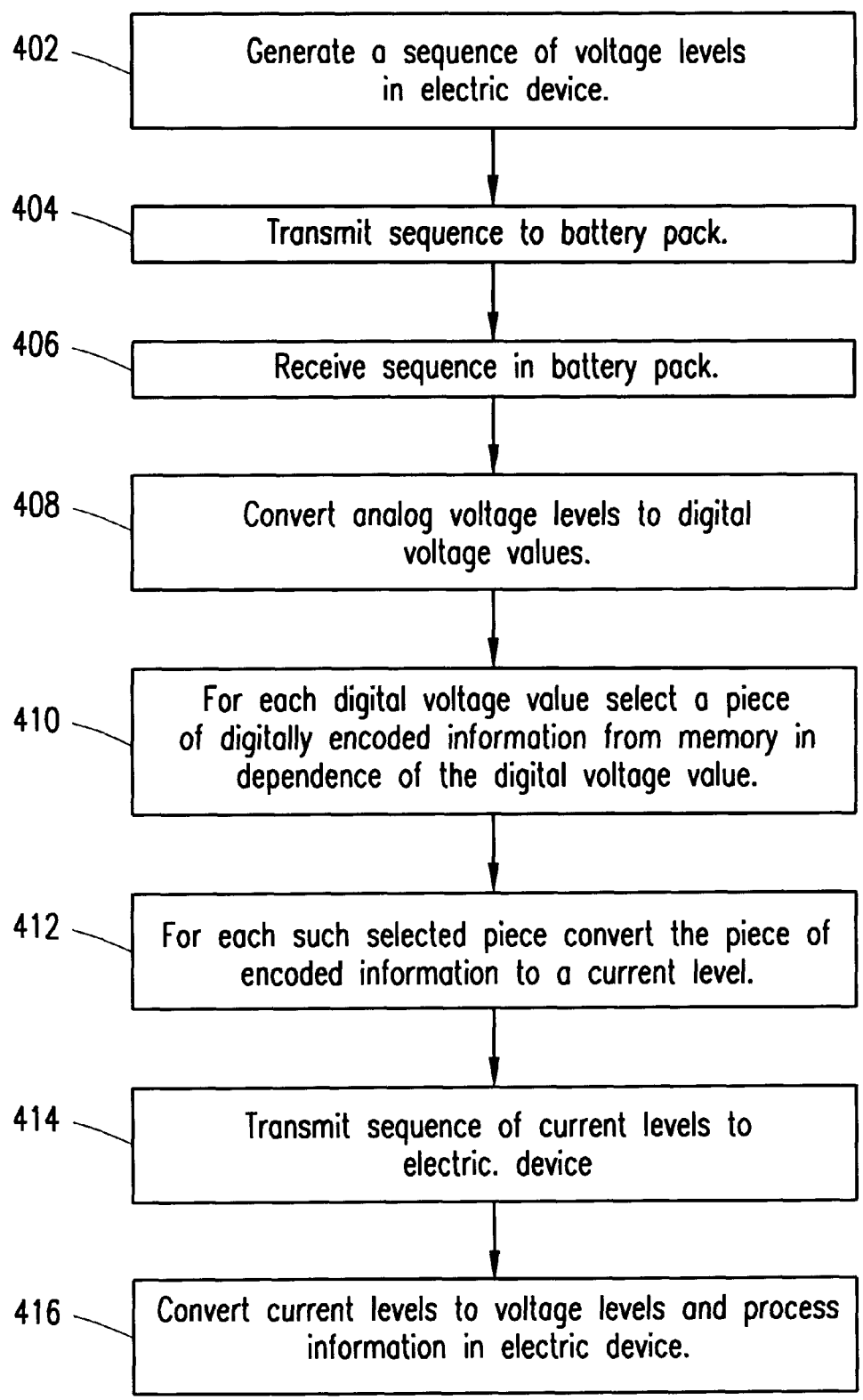
FIG. 3 shows a flow chart of a method of exchanging information according to the invention.

In order to sum up the way the electric device and the battery pack are functioning, reference is now being made to FIG. 3, which shows a flow chart of the method according to which the electric device and the battery pack are working.

First the electric device generates a sequence of voltage levels, step 402. Thereafter the electric device transmits the sequence of voltage levels to the battery pack on the communication line, step 404. The battery pack receives the voltage sequence, step 406, and converts the analog voltage levels to digital voltage values, step 408. For each digital voltage value, a piece of digitally encoded information is selected from the memory in the battery pack. The piece of information selected is dependent of the digital value used, step 410. Each selected piece is then converted into a current level, step 412. Thereby a sequence of current levels is generated. The sequence of current levels are then transmitted to the electric device from the battery pack on the communication line, step 414. Finally the electric device converts the current levels to voltage levels and processes the thus received information, step 416.

The actions performed in these steps have been described before in more detail above in relation to the description of the different circuits in the device and battery pack and in relation to the signal sent. Therefore these actions are not repeated here in this description of the different method steps.

What is claimed is:

1. An electric arrangement for transmitting digitally encoded information from a first electric device to a digital processor in a second electric device, comprising:
   a) an encoder located in the first electric device and containing the digitally encoded information, the encoder containing the digitally encoded information on at least one output terminal,
   b) a single communication line capable of conveying electric information signals representing the information between the electric devices, c) a decoder located in the second electric device, said decoder capable of decoding the information signals into information and supplying the information to the processor in the second device, d) a variable voltage generator located in the second device and connected to the communication line, said variable voltage generator capable of supplying a sequence of voltage levels to the communication line, e) a voltage dependent current generator located in the first device and connected to the at least one output terminal of the encoder and to the communication line, said current generator capable of outputting the information signals in the form of a sequence of current levels through the communication line, said sequence of current levels being dependent both on the voltage level as detected on the communication line and the digitally encoded information on the at least one output terminal of the connected encoder, and f) a current detector located in the second device and connected between the communication line and the decoder for conveying the information signals to the decoder.

2. The arrangement according to claim 1, wherein the first device is a battery pack and wherein the arrangement further comprises at least two power supply lines for supplying power from the battery pack to the second device.

3. The arrangement according to claim 1, wherein the voltage dependent current generator comprises:

an analog-to-digital converter having an analog input terminal and at least one digital output terminal, a multiplexer having at least one address input terminal connected to the at least one digital output terminal of the analog-to-digital converter, at least one data input terminal connected to the at least one output terminal of the encoder, and an output terminal capable of conveying signals from any one of the at least one data input terminals depending on the input of the at least one address input terminal, and a current generator having at least one current output terminal connected to the communication line and a control input terminal connected to the output terminal of the multiplexer, said current generator capable of being switched on and off in dependence on the incoming signals from the multiplexer.

4. The arrangement according to claim 1, wherein the sequence of voltage levels generated by the variable voltage generator is continuous between a first voltage level and a second voltage level.

5. The arrangement according to claim 1, wherein the sequence of voltage levels generated by the variable voltage generator comprises a number of discrete voltage levels between a first voltage level and a second voltage level.

6. The arrangement according to claim 5, wherein the sequence of discrete voltage levels is discontinuous.

7. The arrangement according to claim 1, wherein the encoder comprises a network of discrete components, said network having at least one output terminal which corresponds to the at least one output terminal of the encoder.

8. The arrangement according to claim 1, wherein the encoder comprises, at least in part, a digital memory unit having stored information represented on at least one output terminal which corresponds to the at least one output terminal of the encoder.

9. The arrangement according to claim 1, wherein the encoder comprises, at least in part, software running in a processor having at least one programmable output terminal which corresponds to the at least one output terminal of the encoder.

10. A battery pack for supplying power to a portable electric device, said battery pack comprising;

a) at least one battery cell, b) at least two power supply terminals, c) a communication terminal for exchanging information signals with the device, d) an encoder containing digitally encoded information, said encoder containing the digitally encoded information on at least one output terminal, and e) a voltage dependent current generator connected to the at least one output terminal of the encoder and to the communication terminal, said voltage dependent current generator capable of outputting the information signals in the form of a sequence of current levels to the communication terminal, said sequence of current levels being dependent both on a voltage level as detected on the communication terminal and the digitally encoded information on the at least one output terminal of the connected encoder.

11. The battery pack according to claim 10, wherein the voltage dependent current generator comprises:

an analog-to-digital converter having an analog input terminal and at least one digital output terminal, a multiplexer having at least one address input terminal connected to the at least one digital output terminal of the analog-to-digital converter, at least one data input terminal connected to the at least one output terminal of the encoder, and an output terminal capable of conveying signals from any one of the at least one data input terminals depending on the input of the at least one address input terminal, and a current generator having at least one current output terminal connected to the communication line and a control input terminal connected to the output terminal of the multiplexer, said current generator capable of being switched on and off in dependence on the incoming signals from the multiplexer.

12. The battery pack according to claim 10, wherein the encoder comprises a network of discrete components, said network having at least one output terminal which corresponds to the at least one output terminal of the encoder.

13. The battery pack according to claim 10, wherein the encoder comprises, at least in part, a digital memory unit having stored information represented on at least one output terminal which corresponds to the at least one output terminal of the encoder.

14. The battery pack according to claim 10, wherein the encoder comprises, at least in part, software running in a processor having at least one programmable output terminal which corresponds to the at least one output terminal of the encoder.

15. A portable arrangement including a portable electric device having a digital processor and a battery pack for supplying power to the portable electric device, said portable arrangement comprising:

a) an encoder located in the battery pack and containing digitally encoded information, the encoder containing the digitally encoded information on at least one output terminal, b) a communication line between the battery pack and the portable electric device for conveying electric information signals representing the information from the battery pack to the portable electric device, c) a decoder located in the portable electric device, said decoder capable of decoding the information signals into information and supplying the information to the processor, d) a variable voltage generator located in the portable electric device and connected to the encoder, said variable voltage generator capable of supplying a sequence of voltage levels to the communication line, e) a voltage dependent current generator located in the battery pack and connected to the at least one output terminal of the encoder and to the communication line, said voltage dependent current generator capable of outputting the information signals in the form of a sequence of current levels through the communication line, said sequence of current levels being dependent both on the voltage level as detected on the communication line and the digitally encoded information on the at least one output terminal of the connected encoder; and f) a current detector located in the portable electric device and connected between the communication line and the decoder for conveying the information signals to the decoder.

16. The portable arrangement according to claim 15, wherein the arrangement further includes at least two power supply terminals connected between the portable electric device and the battery pack, and wherein the battery pack includes at least one battery cell.

17. In a battery pack for supplying power to a portable electric device, a method of transmitting electrically encoded information, comprising the steps of:

a) receiving a sequence of voltage levels from the portable electric device, b) selecting digitally encoded information in dependence of said sequence of voltage levels, and c) transmitting said encoded information as a sequence of current levels to said portable electric device.

18. The method according to claim 17, comprising the further steps of:

a) converting a voltage level to a digital voltage value, and b) converting one piece of the encoded information to a current level for transmission to the portable electric device, and wherein c) the step of selecting further comprises selecting a piece of digitally encoded information in voltage form from a memory in dependence of said digital value.

19. In an arrangement for supplying power from a battery pack to a portable electric device, a method of transmitting electrically encoded information, comprising the steps of:

a) generating a sequence of voltage levels in the portable electric device, b) transmitting said sequence of voltage levels from the portable electric device to said battery pack, c) receiving said sequence of voltage levels in the battery pack, d) selecting, in the battery pack, digitally encoded information in dependence of said sequence of voltage levels, e) transmitting said encoded information as a sequence of current levels to said portable electric device, and f) processing the information in the sequence of current levels in the portable electric device.

20. A battery information signal transmitted between a portable electric device and a battery pack for supplying power to said portable electric device, comprising:

a) a sequence of voltage levels generated in the portable electric device, and b) a sequence of current levels generated by the battery pack in dependence of said voltage levels and of digitally encoded information in the battery pack.

21. The battery information signal according to claim 20, wherein the digitally encoded information includes a number of digital values selected using said sequence of voltage levels, and wherein the sequence of current levels corresponds to said selected values.

* * * * *